United States Patent [19]

Breezer et al.

[11] Patent Number: 5,046,434
[45] Date of Patent: Sep. 10, 1991

[54] PLASTIC REINFORCED THERMOFORMED PALLET

[75] Inventors: Harlon W. Breezer; William F. Price, both of Portage, Wis.

[73] Assignee: Penda Corporation, Portage, Wis.

[21] Appl. No.: 518,012

[22] Filed: May 2, 1990

[51] Int. Cl.⁵ ............................................. B65D 19/00
[52] U.S. Cl. .................................. 108/51.1; 108/53.3; 108/901
[58] Field of Search ...................... 108/51.1, 53.1, 53.3, 108/53.5, 901, 902

[56] References Cited

U.S. PATENT DOCUMENTS

| | | |
|---|---|---|
| 3,112,715 | 12/1963 | Callahan et al. ............... 108/533 X |
| 3,164,110 | 1/1965 | Bofinger . |
| 3,281,301 | 10/1966 | Bolesky . |
| 3,330,228 | 6/1967 | Donelly . |
| 3,462,330 | 8/1969 | Greig et al. . |
| 3,467,032 | 9/1969 | Rowlands et al. . |
| 3,628,468 | 12/1971 | Anglebeck, Jr. . |
| 3,630,157 | 12/1971 | Ortenblad ........................ 108/901 X |
| 3,640,229 | 2/1972 | Bell . |
| 3,680,496 | 8/1972 | Westlake, Jr. ..................... 108/51.1 |
| 3,687,764 | 8/1972 | Rogosch et al. . |
| 3,699,902 | 10/1972 | Allgeyer et al. . |
| 3,702,100 | 11/1972 | Wharton ........................... 108/901 X |
| 3,717,922 | 2/1973 | Witkowski . |
| 3,737,496 | 6/1973 | Voorhees, Sr. . |
| 3,832,955 | 9/1974 | Rottinger et al. ............... 108/901 X |
| 3,935,358 | 1/1976 | Wyeth et al. . |
| 3,954,923 | 5/1976 | Valyi . |
| 4,118,261 | 10/1978 | Pedler . |
| 4,157,415 | 6/1979 | Lindenberg . |
| 4,192,701 | 3/1980 | Martin et al. . |
| 4,246,734 | 1/1981 | Fogle, Jr. et al. .............. 108/901 X |
| 4,248,163 | 2/1981 | Caughey .......................... 108/901 X |
| 4,428,306 | 1/1984 | Dresen et al. .................. 108/901 X |
| 4,637,909 | 1/1987 | Lucca . |
| 4,788,088 | 11/1988 | Kohl . |
| 4,790,972 | 12/1988 | Coffman . |
| 4,879,956 | 11/1989 | Shuert ............................. 108/901 X |

FOREIGN PATENT DOCUMENTS

GBX 11/1965 8928 .

Primary Examiner—José Chen
Attorney, Agent, or Firm—Lathrop & Clark

[57] ABSTRACT

A reinforced twin-sheet thermoformed pallet is disclosed which has a substantially planar load-bearing member which is formed from an upper sheet of thermoplastic material and a lower sheet of thermoplastic material located generally in fixed parallel relationship to each other. A plurality of concave depressions in the load-bearing member form feet which depend from the load-bearing member. Each foot is formed as a downwardly depending portion of each of the two sheets of material joined together. Each foot has an inner foot floor formed from the upper sheet and an outer foot floor formed from the lower sheet. A quantity of reinforcing thermoplastic material is located between the inner and outer walls of each foot and is fused to the upper and lower sheets to form an integral foot floor which is substantially parallel to the load-bearing member. The thickness of the foot floor is substantially greater than the combined thicknesses of the upper and lower sheets. Preferably the upper and lower sheets and the reinforcing thermoplastic material are all composed of the same thermoplastic material. The pallet has reinforced feet of substantially increased thickness which extend the usable life of the pallet. This pallet, being composed of a single plastic material, may be economically crushed and recycled.

5 Claims, 3 Drawing Sheets

PLASTIC REINFORCED THERMOFORMED PALLET

FIELD OF THE INVENTION

The present invention relates to pallets in general and to all-plastic pallets which can be formed by twin-sheet thermoforming methods in particular.

BACKGROUND OF THE INVENTION

Pallets are used to facilitate the lifting and transportation of loads by a forklift or similar lifting machine. Softwood pallets are widely available and easily constructed, but because of the variability of timber characteristics the load carrying capacities and lifetime of a wooden pallet are unpredictable. Furthermore, when, due to ordinary wear and usage a wooden pallet must be junked, there is very little salvage value in the scrap wood. Plastic pallets have the advantage of consistent physical characteristics and load-carrying capacity and also have a longer life than wooden pallets. A sturdy plastic pallet such as that disclosed by U.S. Pat. No. 4,428,306, incorporated herein by reference, may be produced using a twin-sheet thermoforming process. That pallet has integral depending feet which extend beneath the load bearing member of the pallet to provide clearance space for the insertion of the arms of a forklift.

Certain portions of a pallet are exposed to greater wear than others, for example the feet. To increase the life of the pallet it is desirable to make these portions of greater strength. Plastic sheets when molded in the thermoforming process are typically reduced in thickness as the sheet is drawn into cavities of the mold to form projecting portions of the molded product such as pallet feet. Because the standard thermoforming process uses sheets of a constant thickness, it is not possible to substantially increase the thickness of one portion of the molded product without increasing the thickness of all portions, with a commensurate increase in the cost and weight of the product. Pallets have been reinforced with metal and molded plastic inserts or reinforced with fused plastic strips. Pallets reinforced with foam reinforcements or with nonplastic materials such as steel, wood, or fiberglass are also known to the art, but these composite pallets are costly to recycle, as the foam or nonplastic components must be separated from the recoverable plastic. Prior art plastic reinforcements usually require a separate and costly molding step or parts which must be attached to the plastic pallet after thermoforming.

What is needed is an all-plastic pallet which may be formed by a twin-sheet thermoforming process with reinforcing plastic portions provided at areas of intense wear.

SUMMARY OF THE INVENTION

A twin-sheet thermoformed pallet of this invention has a substantially planar load-bearing member formed from an upper sheet of thermoplastic material and a lower sheet of thermoplastic material located generally in fixed parallel relationship to each other. The load-bearing member has a plurality of concave depressions which form feet that depend from the load-bearing member. Each foot is formed as a downwardly depending portion of each of the two sheets of material joined together. Each foot has an inner foot floor formed from the upper sheet and an outer foot floor formed from the lower sheet. A quantity of reinforcing thermoplastic material is located between the inner and outer walls of each foot and is fused to the upper and lower sheets to form an integral foot floor which is substantially parallel to the load-bearing member. The upper and lower sheets of thermoplastic material are preferably formed from the same thermoplastic material as is the reinforcing thermoplastic material. The foot floor has a thickness which is substantially greater than the combined thicknesses of the upper and lower sheets of thermoplastic material at the location of a reinforcement.

It is an object of the present invention to provide a twin-sheet thermoformed pallet which has extremely durable projecting feet.

It is a further object of this invention to provide a pallet with increased durability with limited increase in overall weight.

It is also an object of the present invention to provide a twin-sheet thermoformed plastic pallet with feet having floors that are thicker than the combined thicknesses of the two sheets at the foot floor.

It is another object of the present invention to provide a pallet with reinforced feet which is constructed entirely of plastic.

It is yet another object of the present invention to provide a pallet with reinforced feet which may be easily recycled.

Other objects, features, and advantages of the present invention will become apparent from the following specification when read in conjunction with the accompanying drawings.

DESCRIPTION OF THE PREFERRED EMBODIMENT

Figure 1:
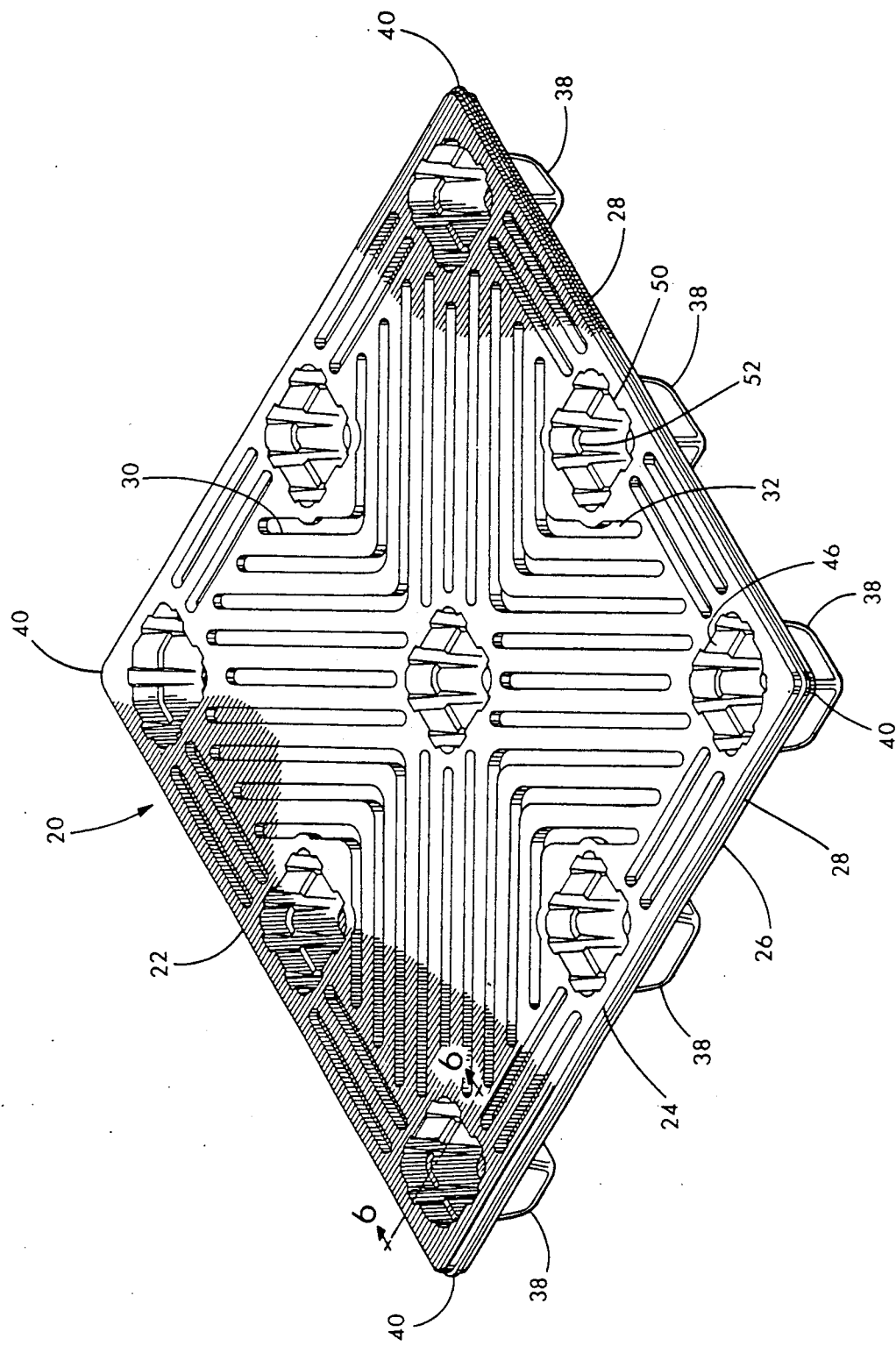
FIG. 1 is a perspective view of the pallet constructed in accordance with the present invention.

Referring now to FIGS. 1-6 wherein like numbers refer to similar parts, FIG. 1 shows the twin-sheet thermoformed plastic pallet 20 of this invention. The layout of the pallet may be that of any pallet with depending feet such as that disclosed in U.S. Pat. No. 4,428,306 which is utilized as an exemplary pallet layout for the purposes of the preferred embodiment of this invention. The pallet 20 includes a substantially planar load-bearing member 22 of a generally constant overall thickness. The load-bearing member 22 is formed of two separate sheets of thermoplastic material, an upper sheet 24 and a lower sheet 26. The two sheets 24, 26 form the upper and lower portions respectively of the load-bearing member 22 and are located generally in fixed parallel relation to each other. The load-bearing member 22 is substantially rectangular and has four similar quarters, each of which is defined by a pair of lines extending outwardly from the center of the pallet 20 to bisect the sides of the rectangle of the load-bearing member 22. The load-bearing member 22 has formed at its outer edge a peripheral lip 28 which is formed by the edges of the upper sheet 24 and the lower sheet 26 being joined together around the periphery of the load bearing member 22 at a point halfway between the two sheets of material.

Figure 2:
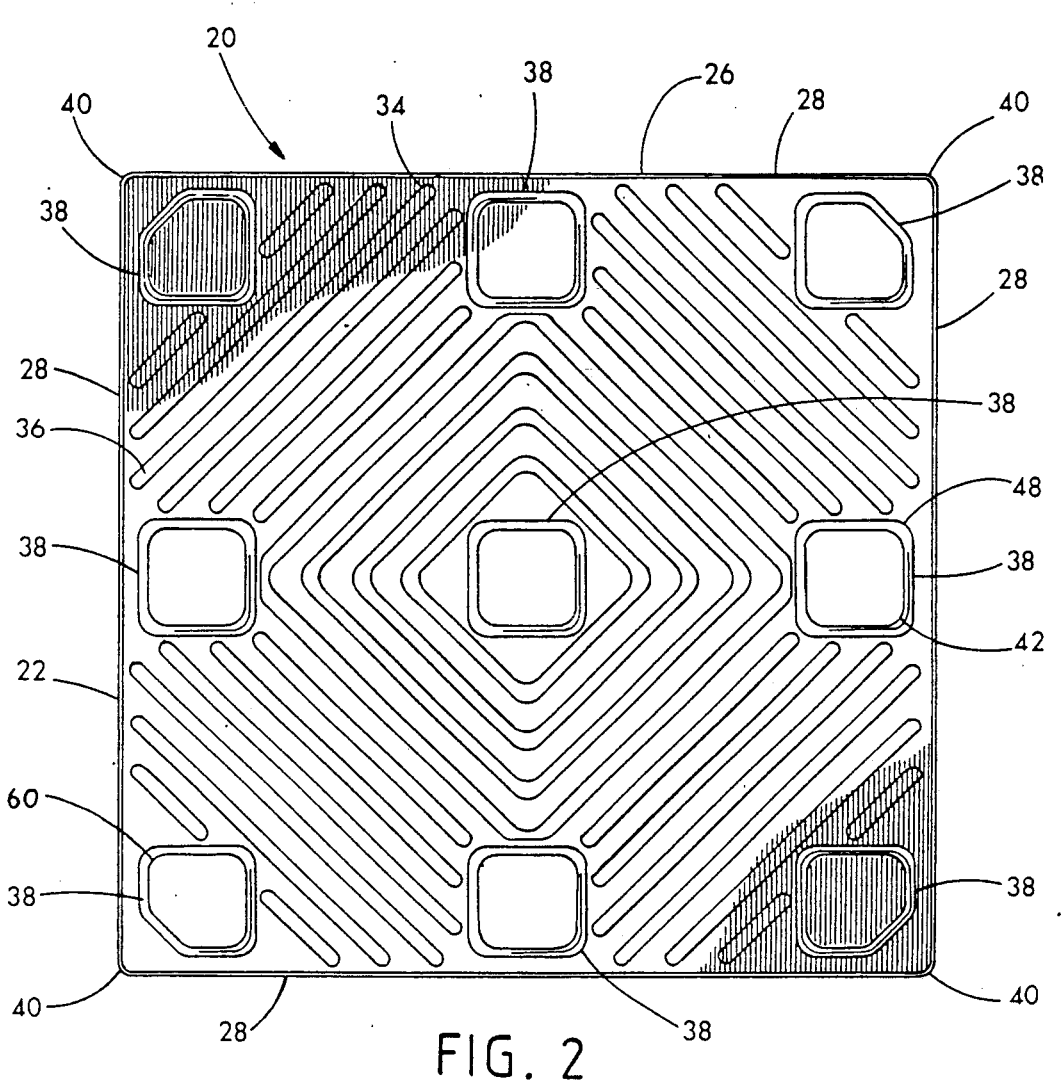
FIG. 2 is a plan view of the bottom of the pallet of FIG. 1.

For increased stiffness the load-bearing member 22 may be provided with a plurality of top channels 30 in the upper sheet and bottom channels 34 in the lower sheet 26 shown in FIG. 2. The floor portions 32 of the top channels may be fused to the ceiling portions 36 of the bottom channels 34 to achieve a desired stiffness.

Figure 3:
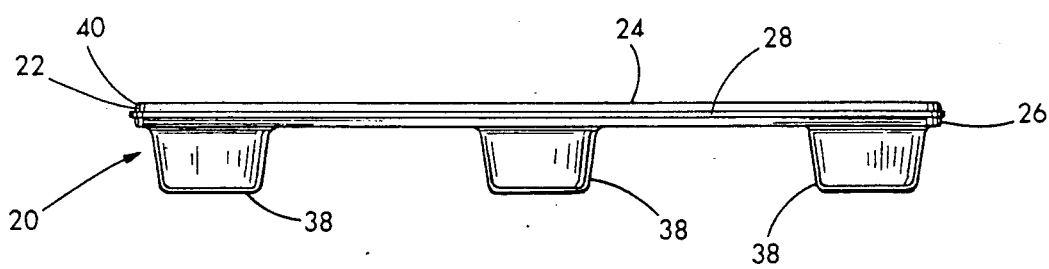
FIG. 3 is a side elevational view of the pallet of FIG. 1.

The pallet 20 has nine feet 38 formed as downwardly extending concave depressions in the load-bearing member 22. Each foot is formed as a downwardly depending portion of the upper sheet 24 and the lower sheet 26 joined together. As best shown in FIG. 3, the feet 38 have a vertical height selected to raise the load-bearing member 22 off of the surface onto which the pallet 20 is placed a predetermined elevation. Each of the feet 38 is generally square in shape, although each of the feet 38 located at each of the corners 40 of the pallet 20 has the outer corner truncated.

Each of the feet 38 has a quantity of thermoplastic material 44 disposed at the bottom between the inner foot floor 41 formed from the upper sheet 24 and the outer foot floor 56 formed from the lower sheet 26. The material 44 is integrally fused to the upper and lower sheets to form an area of increased thicknes which is the foot floor 42. Each foot floor is formed by the fusion of the upper sheet 24, the lower sheet 26 and the quantity of reinforcing thermoplastic material 44 by a process described more fully below. Each foot 38 has an inner wall 46 formed from the upper sheet 24 and an outer wall 48 formed from the lower sheet 26. The inner and outer walls 46, 48 of the feet 38 are selectively joined to stiffen and rigidify each foot 38. The interior of the foot 38 is an upwardly open concave pocket 50. A shelf portion 52 may be formed along the interior surface of each of the concave pockets 50 at a predefined and constant distance above the foot floor 32 to form a shelf for nesting the pallets 20 by receiving the feet of a nested pallet thereon. The inner and outer walls 46, 48 of each foot 38 taper generally inwardly as they extend downward so that the exterior dimension of the foot floor 42 is approximately equal to the horizontal dimension of the pocket 50 at the level of the shelves 52, further aiding in the nesting of the pallets.

The pallet 20 is manufactured by a modified twin-sheet thermoforming process described more fully in the copending patent application titled SELECTIVELY REINFORCED THERMOFORMED ARTICLE AND PROCESS incorporated herein by reference. The pallet 20 can be constructed of any suitable thermoplastic material, but it has been found to be particularly desirable to manufacture the pallet 20 from high density polyethylene. In order to achieve maximum strength, the high density polyethylene preferably has a density of at least 0.950 grams per cubic centimeter. The thickness of each of the thermoplastic sheets 24, 26 is selected depending upon the load requirements intended for the pallet being constructed, and preferably varies from 100 thousandths of an inch to over 250 thousandths of an inch depending on whether a light or heavy duty pallet is desired. In constructing the pallet 20, the first step of the process is to form the two sheets of thermoplastic material 24, 26 through any suitable known process such as sheet extrusion.

In the thermoforming process, a sheet of thermoplastic material is first heated until it is malleable and then mounted onto a thermoform vacuum mold. A thermoform vacuum mold is a one-sided mold having vacuum ports which draw the heated sheet of thermoplastic material against the mold into the desired shape. The effect of this drawing process is that the thickness of the sheet tends to diminish the deeper it is drawn into the mold. In a plastic pallet it is the portions of the pallet formed in the deepest sections of the mold, the foot floors 42, which are subjected to the greatest wear and abrasion. In order to add thickness, and thus strength and durability, to the foot floors 42 without increasing the general thickness of the thermoplastic sheets 24, 26 the pallet 20 is produced by a reinforced thermoforming process as illustrated in FIGS. 4–6.

Figure 4:
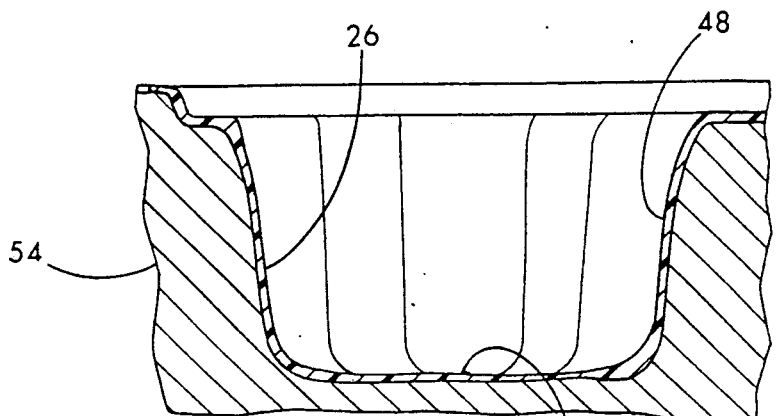
FIG. 4 is an enlarged fragmentary cross-sectional view of the first sheet of the pallet of this invention in a mold.

To produce the reinforced foot floors 42 of the pallet 20, the lower sheet 26 of a suitable thermoplastic material is heated and drawn into the lower thermoform vacuum mold 54 as shown in FIG. 4. This lower sheet 26 forms the outer wall 48 of the foot 38 as well as the outer foot floor 56. While the lower sheet 26 is still hot, a preheated quantity of thermoplastic material 44, which may be in the form of a malleable thermoplastic reinforcing insert, is taken from a preheating oven and placed by manual, mechanical, or robotic means on the outer foot floor 56 within each foot 38 that is to be reinforced as shown in FIG. 5. The insert 44 is shaped to substantially cover the lower sheet floor 56 of the lower sheet 26 and is of the proper thickness to achieve the desired final depth of the foot floor 42.

The insert 44 may be of any thermoplastic material with the desired reinforcing characteristics, but if eventual recycling of the pallet is envisioned it is perferable to employ an insert of the same thermoplastic material as the upper and lower sheets.

Figure 5:
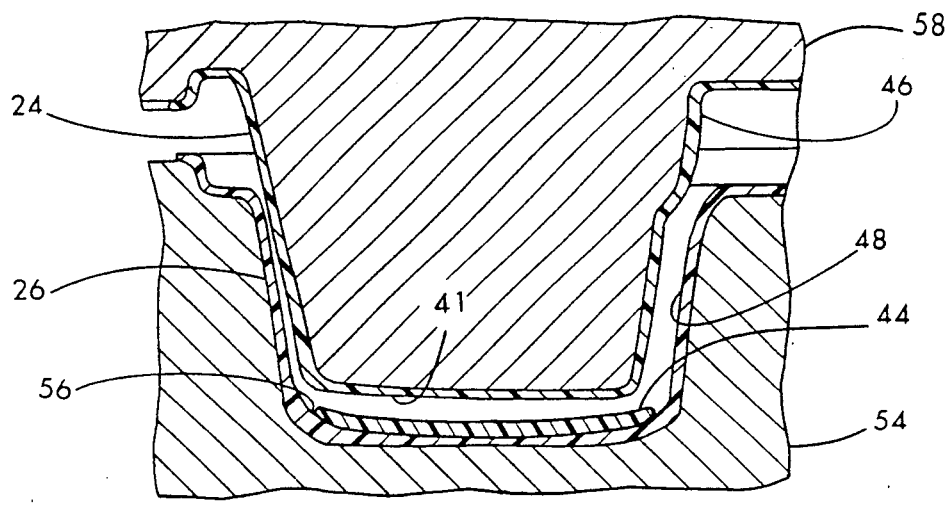
FIG. 5 is an enlarged fragmentary cross-sectional view of a heated thermoplastic insert placed on the first sheet of FIG. 4, with the second sheet spaced above the insert and the first sheet.
Figure 6:
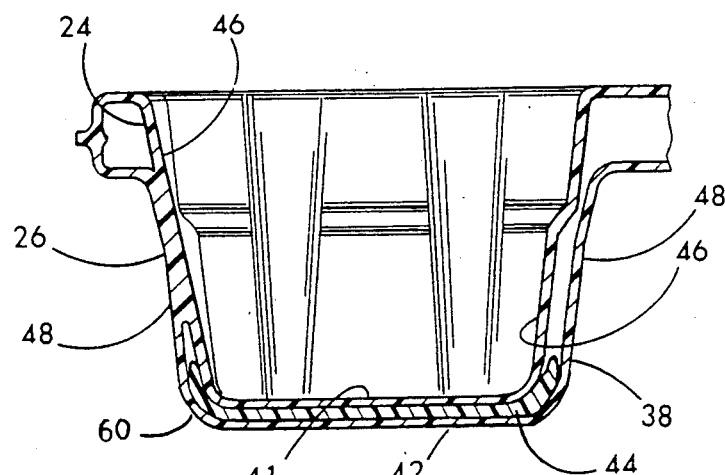
FIG. 6 is an enlarged fragmentary cross-sectional view of the pallet of FIG. 1 taken along the section line 6—6.

While the lower sheet 26 and the reinforcing insert 44 are still hot and malleable, the upper sheet 24 which has been drawn into an upper thermoform vacuum mold 58 is pressed down over the lower sheet 26 within the lower mold 54 overlying the insert 44, as shown in FIG. 5. When the thermoplastic upper sheet 24 is forced into contact with the insert 44 and the lower sheet 26 a fusion of the thermoplastic material takes place, forming an integral plastic bond at those locations where the sheets come in contact. By this process the top channels 30 of the upper sheet 24 also are fused to the bottom channels 34 of the lower sheet 26 to structurally stiffen the load bearing member 22. The inner wall 46 is also fused to the outer wall 48 of the foot 38 to produce a rigid foot. The molds 54, 58 press the upper sheet 24 onto the insert 44 resting on the outer foot floor 56 and cause the insert 44 to fuse with the upper sheet 24 and the lower sheet 26 forming one solid integral reinforced foot floor 42. This forming process will also tend to extrude the thermoplastic material of the insert 44 upwards into the interior space between the inner and outer side walls 46, 48 of the foot 38 fusing it to the side walls 46, 48, giving additional reinforcement. The reinforced foot floor 42 is substantially thicker than the combined thicknesses of the upper and lower sheets 24, 26 at the location of the foot floor.

A common area of increased wear on a foot 38 of a pallet 20 is at the intersection of the side walls with the foot floor 42. The corners or edges 60 formed by this intersection are also reinforced by the quantity of thermoplastic material 44. The inner foot floor 41 in the upper mold 58 presses the reinforcing quantity 44 outwards towards the edges 60 of the foot 38 when the upper and lower molds are pressed together. By the shape of the surfaces of the upper and lower molds 58, 54, the quantity of thermoplastic material 44 as well as the plastic of the upper and lower sheets 24, 26 can be directed to move towards areas where reinforcing is desired during the molding process. Plastic material may thus be selectively moved upwardly between the two sheets. In general, the fused plastic of the upper and lower sheets 24, 26 and the quantity of reinforcing plastic 44 will be moved by the thermoformed molds to fill voids in the mold cavity.

The pallet of this invention allows optimum thicknesses of plastic at desired locations without requiring additional plastic at areas exposed to reduced wear or loading. In this way pallets of a desired strength may be produced using less plastic material with a commensurate reduction in cost. The pallet of this invention is also advantageously used when it is desired to produce a strengthened pallet of limited weight.

The reinforced foot 38 produced by this thermoforming process is shown in FIG. 6. The pallet 20 with reinforced feet 38 is better able to endure extended wear.

Because the pallet 20 is composed entirely of a single thermoplastic material, when it is necessary to recycle the pallet 20 due to excessive wear, the pallet 20 may be economically ground down into thermoplastic chips and reformed. Since there are no foreign materials in the pallet, all the materials of the pallet may be recycled. The pallet of this invention can be constructed from other flowable moldable materials other than the thermoplastic resins described herein. Furthermore, the materials of the pallet can be constructed in varying thicknesses and the pallet itself can be constructed in varying sizes.

The pallet 20 of this invention may also be produced by a thermoforming process wherein the lower sheet 26 is drawn into the lower thermoform vacuum mold 54 and a liquid thermoplastic material is extruded onto the outer foot floor 56 by a removable extruding tool. After the tool is withdrawn the upper sheet 24 in the upper thermoform vacuum mold 58 may be pressed down onto the lower sheet 26 within the lower mold 54 and continued pressure applied until the lower sheet 26, upper sheet 24, and extruded material, are fused together at the foot floor 42 to produce a unitary reinforced foot floor 42.

The pallet 20 of this invention may also be produced by a thermoforming process wherein the lower sheet 26 is drawn into the lower thermoform vacuum mold 54 and the upper sheet 24 is formed in the upper thermoformed vacuum mold and pressed down onto the lower sheet 26 within the lower mold 54 and, while continued pressure is applied, an injection tube is inserted through a fitting in the lower thermoform vacuum mold 54 and inserted through the malleable outer wall 48 formed by the lower sheet 26. Liquid thermoplastic material then may be injected through the injection tube between the upper and lower sheets 24, 26. The heated injected thermoplastic material will then fuse with the upper and lower sheets 24, 26 to produce a reinforced foot floor 42.

The selectively reinforced plastic pallet of this invention may have any number of feet appropriate to the pallet's dimensions and shape, which may be other than square.

It is to be understood that the present invention is not limited to the particular arrangement and embodiments of parts disclosed and illustrated herein, but embraces all such modified forms thereof as come within the scope of the following claims.

What is claimed is:

1. A twin-sheet thermoformed thermoplastic pallet comprising:
    (a) a substantially planar load-bearing member formed from an upper sheet of thermoplastic material of a selected thickness and a lower sheet of thermoplastic material of a selected thickness located generally in fixed parallel relationship to each other;
    (b) a plurality of feet depending from the load-bearing member, each foot being a downwardly protruding portion of each of the two sheets of material joined together and terminating in a foot floor extending substantially parallel to the load-bearing member; and
    (c) wherein each foot floor includes an inner foot floor formed from the upper sheet of thermoplastic material and an outer foot floor formed from the lower sheet of thermoplastic material, and additionally includes a quantity of reinforcing thermoplastic material located bewteen the inner and outer foot floors of each foot and fused thereto, the fused inner foot floor, reinforcing material and outer foot floor comprising an integral reinforced foot floor having a thickness substantially greater than the combined thickness of the material of the upper and lower sheets at that location.

2. The pallet of claim 1 wherein the upper sheet, the lower sheet, and the quantity of reinforcing thermoplastic material are all composed of the same thermoplastic material.

3. The pallet of claim 1 wherein each of the feet includes integral side wall portions formed of deformed portions of the upper and lower sheets of thermoplastic material, and wherein the reinforcing thermoplastic material extends up the side wall portions between the two sheets of material and is fused thereto to form integral reinforced side wall portions.

4. The pallet of claim 3 wherein the side walls of each foot join the foot floor to form a foot edge and wherein the foot edge is reinforced by portions of the reinforcing thermoplastic material fused between the upper and lower sheets.

5. A twin-sheet thermoformed thermoplastic pallet comprising:
    (a) a substantially planar load-bearing member formed from an upper sheet of thermoplastic material of selected thickness and a lower sheet of thermoplastic material of selected thickness located generally in fixed parallel relationship to each other;
    (b) a plurality of feet depending from the load-bearing member, each foot being a downwardly protruding portion of each of the two sheets of material joined together and terminating in a foot floor extending substantially parallel to the load-bearing member; and
    (c) wherein each foot has a side wall comprised of an outer side wall composed of the lower sheet of thermoplastic material and an innner side wall composed of the upper sheet of thermoplastic material, and a quantity of reinforcing thermoplastic material located between portions of the inner and outer side walls of each foot and fused to the said portions of the inner and outer side walls to form an integral solid side wall portion having a thickness substantially greater than the combined thickness of the upper and lower sheets at the locations of such portions.

* * * * *